(12) United States Patent
Stange (10) Patent No.: US 11,889,845 B2
(45) Date of Patent: *Feb. 6, 2024

(54) METHODS FOR TREATING A DIVIDED CHEESE PRODUCT AND COMPOSITIONS THEREOF

(71) Applicant: Allied Blending LP, Keokuk, IA (US)

(72) Inventor: Andrea Stange, Fenton, MO (US)

(73) Assignee: Allied Blending LP, Keokuk, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/377,067

(22) Filed: Jul. 15, 2021

(65) Prior Publication Data

US 2021/0337819 A1 Nov. 4, 2021

Related U.S. Application Data

(63) Continuation of application No. 16/818,251, filed on Mar. 13, 2020, now Pat. No. 11,096,400, which is a continuation of application No. 16/577,530, filed on Sep. 20, 2019, now Pat. No. 10,624,361.

(51) Int. Cl.

| | | |
|---|---|---|
| *A23C 19/16* | (2006.01) | |
| *A23C 19/086* | (2006.01) | |
| *A23C 19/10* | (2006.01) | |
| *A23P 10/43* | (2016.01) | |
| *A23C 19/06* | (2006.01) | |

(52) U.S. Cl.
CPC ............ *A23C 19/06* (2013.01); *A23C 19/086* (2013.01); *A23C 19/105* (2013.01); *A23P 10/43* (2016.08); *A23C 2250/10* (2013.01)

(58) Field of Classification Search
CPC ..... A23C 19/16; A23C 19/086; A23C 19/105; A23C 2250/10; A23P 10/43
See application file for complete search history.

(56) References Cited

U.S. PATENT DOCUMENTS

| | | |
|---|---|---|
| 3,694,231 A | 9/1972 | Izzo |
| 5,626,893 A | 5/1997 | Reddy |
| 5,747,078 A | 5/1998 | De Jong |
| 5,895,680 A | 4/1999 | Cirigliano |
| 6,126,974 A | 10/2000 | Ang |
| 6,261,625 B1 | 7/2001 | Pickford |

(Continued)

FOREIGN PATENT DOCUMENTS

| | | |
|---|---|---|
| EP | 0272923 A2 | 6/1988 |
| EP | 1887885 A2 | 2/2008 |
| WO | 2018200836 | 11/2018 |

OTHER PUBLICATIONS

Akoh, C. "Fat Replacers", Food Technol., 52(3):47-53, (1998).

(Continued)

*Primary Examiner* — Katherine D Leblanc
(74) *Attorney, Agent, or Firm* — Husch Blackwell LLP (57) ABSTRACT

Disclosed herein is a method for producing a package of cheese shreds. Cheese shreds and anticaking agent are mixed at a load between 2 wt. % and 10 wt. % in relation to the cheese shreds to form anticake-coated cheese shreds. The anticaking agent comprises 15-30 wt. % reducing sugar; 0.2-0.8 wt. % glucose oxidase; and 0.5-2 wt. % salt chosen from sodium chloride, calcium chloride, and magnesium chloride. The anticake-coated cheese shreds are then sealed into a package without modifying the atmosphere in the package or using an inert gas flush.

18 Claims, 2 Drawing Sheets

(56) References Cited

U.S. PATENT DOCUMENTS

| | | |
|---|---|---|
| 6,426,102 B1 | 7/2002 | Isom |
| 7,279,192 B2 | 10/2007 | Abboud |
| 8,017,169 B2 | 9/2011 | Trecker |
| 10,624,361 B1 | 4/2020 | Stange |
| 11,033,039 B2 | 6/2021 | Patel |
| 11,528,920 B2 | 12/2022 | Patel |
| 2003/0021873 A1 | 1/2003 | Willits |
| 2004/0109927 A1 | 6/2004 | Ang |
| 2004/0213884 A1 | 10/2004 | Abboud |
| 2005/0221029 A1 | 10/2005 | Cater |
| 2006/0115567 A1 | 6/2006 | Hoegh |
| 2006/0193954 A1 | 8/2006 | Pruett, Jr. |
| 2006/0210694 A1 | 9/2006 | Chappell |
| 2007/0275127 A1 | 11/2007 | Ball |
| 2008/0069873 A1 | 3/2008 | Pearnchob |
| 2008/0299103 A1 | 12/2008 | George |
| 2010/0330369 A1 | 12/2010 | Veelaert |
| 2011/0212149 A1 | 9/2011 | Lobee |
| 2011/0229622 A1 | 9/2011 | Merrill |
| 2011/0244105 A1 | 10/2011 | Galer |
| 2013/0337142 A1 | 12/2013 | Fannon |
| 2015/0079224 A1 | 3/2015 | Ball |
| 2018/0310582 A1 | 11/2018 | Patel |
| 2021/0084923 A1 | 3/2021 | Stange |
| 2021/0259267 A1 | 8/2021 | Patel |

OTHER PUBLICATIONS

Ash, M. "Handbook of Fillers, Extenders and Diluents", Second Edition, Compiled by Michael and Irene Ash, 2007, Synapse Information Resources, Inc, p. 179.

Declaration of Andrea Stange, PhD, Under 37 C.F.R. § 1.132, date of signature Feb. 20, 2020; 9 pages.

Declaration of Paul V. Gass Under 37 C.F.R. §1.132, date of signature Dec. 20, 2013; 12 pages.

International Application No. PCT/US2018/029601, International Search Report and Written Opinion of the International Searching Authority dated Aug. 8, 2018, 11 pages.

International Application No. PCT/US2013/045810; International Preliminary Report on Patentability, dated Dec. 16, 2014; 10 pages.

International Application No. PCT/US2013/045810; International Search Report and Written Opinion of the International Searching Authority, dated Sep. 13, 2013; 14 pages.

International Application No. PCT/US2018/029601; International Preliminary Report on Patentability, dated Nov. 7, 2019; 8 pages.

U.S. Appl. No. 13/736,693; Applicant-Initiated Interview Summary, dated Dec. 20, 2017; 3 pages.

U.S. Appl. No. 13/736,693; Application as filed, dated Jan. 8, 2013; 16 pages.

U.S. Appl. No. 13/736,693; Final Office Action, dated Aug. 28, 2014; 13 pages.

U.S. Appl. No. 13/736,693; Final Office Action, dated Jun. 15, 2017; 11 pages.

U.S. Appl. No. 13/736,693; Non-Final Office Action, dated Feb. 14, 2014; 16 pages.

U.S. Appl. No. 13/736,693; Non-Final Office Action, dated Oct. 7, 2015; 12 pages.

U.S. Appl. No. 13/736,693; Notice of Appeal, dated Dec. 14, 2017; 2 pages.

U.S. Appl. No. 13/917,902; Advisory Action, dated May 3, 2018; 4 pages.

U.S. Appl. No. 13/917,902; Applicant-Initiated Interview Summary, dated Apr. 12, 2018; 3 pages.

U.S. Appl. No. 13/917,902; Applicant-Initiated Interview Summary, dated May 24, 2018; 3 pages.

U.S. Appl. No. 13/917,902; Examiner's Answer to Appeal Brief, dated Sep. 24, 2018; 5 pages.

U.S. Appl. No. 13/917,902; Final Office Action, dated Jan. 31, 2018; 5 pages.

U.S. Appl. No. 13/917,902; Non-Final Office Action, dated May 24, 2017; 8 pages.

U.S. Appl. No. 13/917,902; Non-Final Office Action, dated Sep. 1, 2016; 10 pages.

U.S. Appl. No. 15/963,781; Non-Final Office Action, dated Sep. 3, 2019; 32 pages.

U.S. Appl. No. 16/170,917; Final Office Action, dated Jan. 8, 2020; 24 pages.

U.S. Appl. No. 16/170,917; Non-Final Office Action, dated Oct. 4, 2019; 27 pages.

U.S. Appl. No. 16/170,917; Notice of Allowance, dated Feb. 17, 2021; 9 pages.

U.S. Appl. No. 16/577,530; Application as filed, dated Sep. 20, 2019; 32 pages.

U.S. Appl. No. 16/577,530; Non-Final Office Action, dated Jan. 8, 2020; 18 pages.

U.S. Appl. No. 16/577,530; Notice of Allowance, dated Mar. 10, 2020; 11 pages.

U.S. Appl. No. 16/818,251; Non-Final Office Action, dated Oct. 16, 2020; 19 pages.

U.S. Appl. No. 16/818,251; Notice of Allowance, dated Apr. 16, 2021; 8 pages.

U.S. Appl. No. 17/315,864; Advisory Action, dated Jun. 20, 2022; 7 pages.

U.S. Appl. No. 17/315,864; Applicant-Initiated Interview Summary, dated May 20, 2022; 2 pages.

U.S. Appl. No. 17/315,864; Examiner-Initiated Interview Summary, dated Jun. 15, 2022; 1 page.

U.S. Appl. No. 17/315,864; Final Office Action, dated May 10, 2022; 27 pages.

U.S. Appl. No. 17/315,864; Non-Final Office Action, dated Oct. 28, 2021; 32 pages.

U.S. Appl. No. 17/315,864; Notice of Allowance, dated Aug. 25, 2022; 8 pages.

METHODS FOR TREATING A DIVIDED CHEESE PRODUCT AND COMPOSITIONS THEREOF

This application claims the benefit of the filing date as a continuation of the U.S. patent application Ser. No. 16/818,251, filed on Mar. 13, 2020, now allowed, which is a continuation of the U.S. patent application Ser. No. 16/577,530 filed on Sep. 20, 2019, now U.S. Pat. No. 10,624,361, the disclosures of which are incorporated by reference in their entireties for all purposes.

For convenience, hard and semi-hard cheeses are often sold in diced, shredded or chunked form. These divided cheeses have a propensity to clump together during storage, especially high moisture or high fat cheeses, making them difficult to handle. Many anticaking agents are commercially available, including ingredients such as celluloses, starches, flours, clays, such as bentonite, metal carbonates, such as calcium carbonate, and silicon dioxide. Anticaking agents are often added to divided cheese, to prevent sticking and to preserve freshness.

An inert gas flush, typically nitrogen and/or carbon dioxide, purges the packages of oxygen to preserve freshness. A significant amount of cheese and anticaking agent accumulate below the gas flush point of the production lines. Often the cheese clogs package seals and the bags cannot seal properly due to the powerful blasts of gas flush. The cheese also blows onto the floor or jams equipment, causing sanitation problems, delays for clean up, and frequent maintenance.

SUMMARY

The oxygen scavenging system of a reducing sugar, such as dextrose, and glucose oxidase has been used in the cheese industry to remove residual oxygen after gas flush, but it was not capable of replacing the gas flush step. To the contrary, when an anticaking agent comprising oxygen scavenging system disclosed herein removes the oxygen in well-sealed packaged cheese, the gas flush step is entirely unnecessary. To achieve this, the oxygen scavenging system is significantly more powerful than previously described in the art. Moreover this system has not been previously described with a salt component, such as sodium chloride, which accelerates the rate of oxygen drawn down in sealed packages.

The present disclosure provides a method for producing a package of cheese shreds. Cheese shreds and anticaking agent are mixed at a load between 2 wt. % and 10 wt. % in relation to the cheese shreds to form anticake-coated cheese shreds. The anticaking agent comprises 15-30 wt. % reducing sugar, 0.2-0.8 wt. % glucose oxidase; and 0.5-2 wt. % 0.5-2 wt. % salt chosen from sodium chloride, calcium chloride, and magnesium chloride. The anticake-coated cheese shreds are then sealed into a package without modifying the atmosphere in the package or using an inert gas flush.

In certain embodiments, the method for producing a package of cheese shreds comprises mixing cheese shreds and anticaking agent at a load between 2 wt. % and 10 wt. % in relation to the cheese shreds to form anticake-coated cheese shreds, the anticaking agent comprising 15-30 wt. % dextrose; 0.2-0.4 wt. % glucose oxidase; and 0.5-1.9 wt. % sodium chloride; and sealing the anticake-coated cheese shreds into a package without modifying the atmosphere in the package or using an inert gas flush; wherein the initial concentration of oxygen in headspace of the package is 20.9%, the concentration of oxygen in the sealed package is less than 5% within 1 day of being sealed and is less than 0.5% within 3 days of being sealed.

The present disclosure also provides an anticaking agent for cheese, comprising: 15-30 wt. % reducing sugar; 0.2-0.8 wt. % glucose oxidase; and 0.5-2 wt. % salt chosen from sodium chloride, calcium chloride, and magnesium chloride; wherein the anticaking agent draws down atmospheric oxygen concentration in a sealed package from 20.9% to less than 0.5% with 3 days of being sealed In certain embodiments, the anticaking agent for cheese comprises 15-30 wt. % dextrose, 0.2-0.4 wt. % glucose oxidase, and 0.5-1.9 wt. % sodium chloride wherein the anticaking agent draws down atmospheric oxygen concentration in a sealed package from 20.9% is less than 5% within 1 day of being sealed and to less than 0.5% within 3 days of being sealed.

DETAILED DESCRIPTION

Modified atmosphere ("MA") is the practice of modifying the internal atmosphere of a package to improve its shelf life. The need for this technology for food arises from the short shelf life of food products such as dairy. Oxygen is readily available for lipid oxidation reactions. From a microbiological aspect, oxygen encourages the growth of aerobic spoilage microorganisms. Therefore, reducing oxygen and replacing it with other gases can reduce or delay oxidation reactions and microbiological spoilage. Oxygen scavengers may also reduce unwanted browning during cooking due to lipid oxidation by halting the auto-oxidative chemical process.

Figure 1:
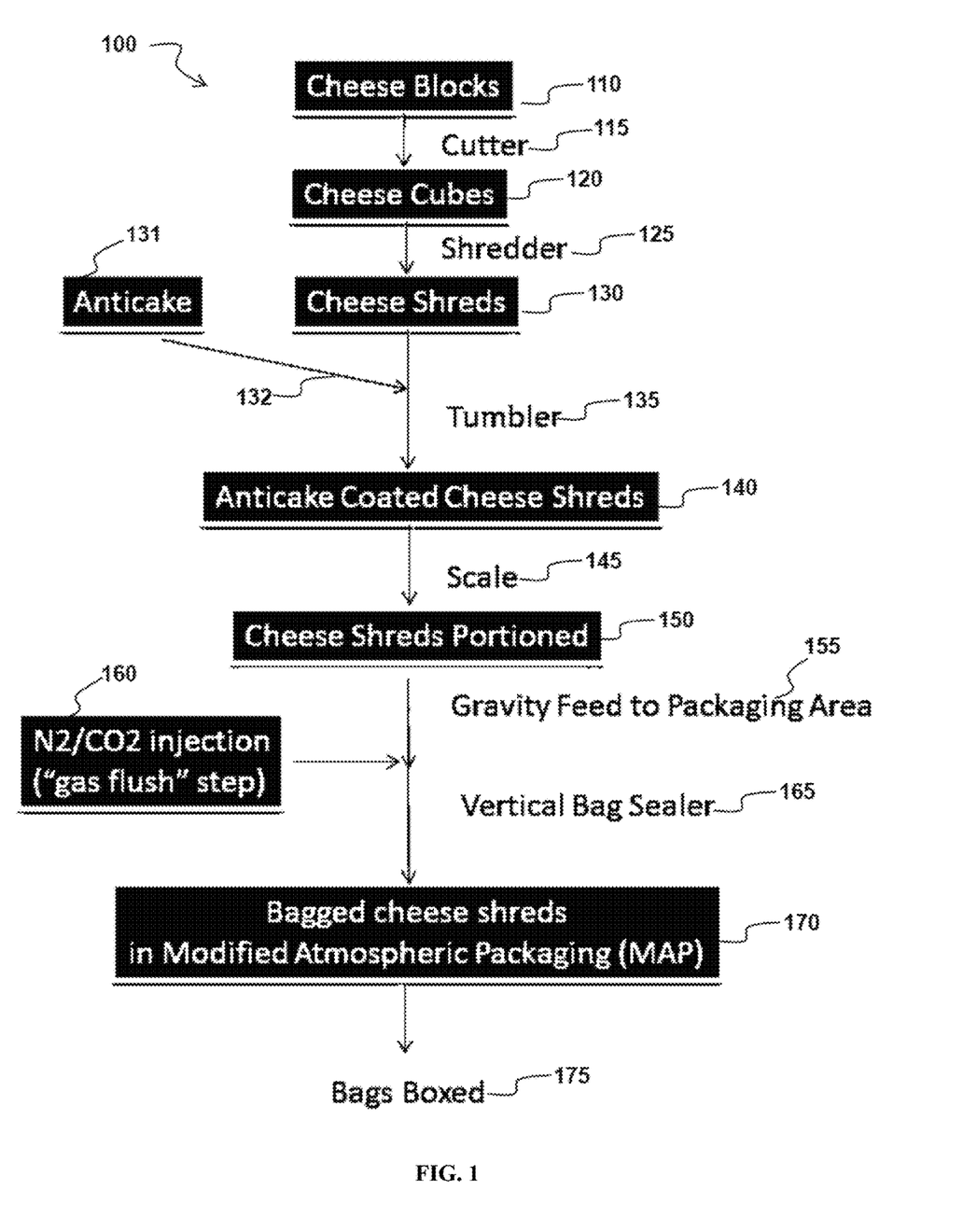
FIG. 1 is a flowchart depicting the process of modified atmosphere packaging a divided cheese product.

FIG. 1 depicts a typical process 100 of modified atmosphere packaging a divided cheese product. Cheese blocks 110 are passed through a cutter 115 to product cheese cubes 120, which then pass through a shredder 125 to produce cheese shreds 130. The cheese shreds 130 are mixed 132 with anticaking agent 131 in a tumbler 135 to provided anticake-coated cheese shreds 140. The coated shreds 140 are scaled 145 into cheese shred portions 150, which pass through a gravity feed to the packaging area 155. The bags are injected with nitrogen and/or carbon dioxide gas flush 160 before the bags pass through the vertical bag sealer 165. The bagged cheese shreds in modified atmospheric packaging (MAP) 170 are boxed 175 for shipment and sale.

A stable atmosphere of gases inside the packaging can be achieved using active techniques, such as gas flushing and compensated vacuum, or passively by designing "breathable" films. Modification generally lowers the amount of oxygen ($O_2$) in the headspace of the package. Oxygen can be replaced with nitrogen ($N_2$), a comparatively inert gas, and/or carbon dioxide ($CO_2$). Low $O_2$ and high $CO_2$ and/or $N_2$ concentrations in packages limit the growth of Gram negative bacteria, molds and aerobic microorganisms, such as *Pseudomonas* spp. $CO_2$ penetrates bacterial membranes and affects intracellular pH. Therefore, lag phase and generation time of spoilage microorganisms are increased, extending the shelf life of refrigerated foods.

In MA packages of divided cheese, a combination of nitrogen and carbon dioxide is typically used. MAP removes much of the oxygen in air by inert gas flashing. Oxygen scavenging is considered to an optional add-on to MAP to absorb the oxygen not removed with MAP.

"Anticaking agent" in the food industry, especially in the dairy and cheese industry, is defined as any safe and suitable food ingredient which, when added, should prevent lumping of shredded, diced or chunked dairy product, such as cheese, during storage at room temperature or refrigerator or freezer. The anticaking agents described herein also comprise an oxygen scavenging system which establishes and maintains a low oxygen environment to promote easy packaging, freshness, and protection against spoilage and pathogenic microbes. Such a dairy product with anticaking agent in is easy to handle at the time of applying on the final food product. Some cheeses, after they are chunked and if the anticaking agent is not used, will cake and are very difficult to handle and spoil quickly without refrigeration. This is a problem especially with high moisture and high fat cheeses.

The term "cheese" as used herein refers broadly to all types of cheeses including, for example, cheeses as defined under the CODEX general Standard for Cheese and as defined under various state and national regulatory bodies. Exemplary classes of cheeses include, but are not limited to, firm/semi-hard cheeses, soft cheeses, analog cheeses, blended cheeses, and pasta filata cheeses, among other types of cheeses.

The term "grated cheese" or "divided cheese" is a class of foods prepared by grinding, grating, shredding, or otherwise comminuting cheese of one variety or a mixture of two or more varieties. The term "cheese shreds" may be used in place of "grated" to describe alternative forms of cheese, where the particles of cheese are in the form of cylinders, shreds, or strings. Alternatively, the terms "chipped" or "chopped" describes particles of cheese that are in the form of chips in the divided cheese.

The term "reducing sugars" refer to sugars which contain a ketone or aldehyde group allowing the sugar to act as a reducing agent. Examples of reducing sugars include dextrose, D-glucose, D-galactose, maltose, lactose, D-mannose, D-fructose, and D-xylose, among other reducing sugars. "Non-reducing sugars" refer to sugars having their anomeric carbons part of an acetal (not hemi-acetal) functional group. Sucrose is an example of a non-reducing sugar.

The term "oxidoreductase enzyme" refers to enzymes that catalyze the reaction between a reducing sugar and oxygen ($O_2$) to form a lactone and hydrogen peroxide. In aqueous environments, the lactones may hydrolyze over time to their corresponding aldobionic acids. Examples of oxidoreductase enzymes include hexose oxidase (i.e., D-hexose:oxygen 1-oxidoreductase), glucose oxidase, galactose oxidase, pyranose oxidase, and lactose oxidase, among others. The enzyme may be made by fermenting yeast strains that have been modified to include the oxidoreductase encoding gene. For example, hexose oxidase may be produced by fermentation of a selected strain of the yeast *Hansenula polymorpha* modified with the hexose oxidase encoding gene isolated from the algae *Chondrus crispus*.

The oxygen scavenger system is an essential component of the anticaking agents described herein, providing the ability to package divided cheese products without a gas flush. The oxygen scavenger system also preserves freshness and prevents microbial growth. Prior oxygen scavenger systems in the anticaking agents used between 4 wt. % and 25 wt. % reducing sugar, such as dextrose, and between 0.01 wt. % and 0.05 wt. % oxidoreductase enzyme, such as glucose oxidase. This level of enzyme still required a modified atmosphere during packaging to preserve freshness. This prior oxygen scavenging system was designed to be used in MA packaging. The oxygen draw down rate was too slow to prevent microbial growth and spoilage on its own, reducing 02 concentration by only between about 2% and about 4% from the original amount after gas flush in about 3 days. Without a gas flush during package, a concentration of enzyme of 0.05 wt. % or 0.1 wt. % alone was not high enough to draw down atmospheric oxygen fast enough to prevent spoilage.

The present disclosure provides an anticaking agent comprising between 0.2 wt. % and 0.8 wt. % oxidoreductase enzyme. The oxygen scavenging system disclosed herein replaced the gas flushing step in modified atmospheric packaging. The disclosed oxygen scavenging system can reduce 02 concentrations from atmospheric oxygen (20.9%) to less than about 5% in about 1 to 3 days, such as to less than about 0.5% in about 1 to about 3 days, depending on the type of cheese.

In some embodiments, the oxygen scavenger system combines dextrose and glucose oxidase. In certain embodiments, the anticaking agent comprises 15-30 wt. % dextrose and 0.2-0.8 wt. % glucose oxidase. Using more than 0.4 wt. % glucose oxidase generally did not further increase the oxygen draw down rate and needlessly increases the cost of manufacturing. In some embodiments, the oxygen scavenger system comprises 15 wt. %, 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, or 30 wt. % dextrose in combination with 0.2 wt. %, 0.25 wt. %, 0.3 wt. %, 0.35 wt. %, or 0.4 wt. % glucose oxidase. The dextrose may be in a hydrated crystalline form, such as dextrose monohydrate. In certain embodiments, the anticaking agent comprises more than 15 wt. % dextrose. In certain embodiments, the anticaking agent comprises less than 30 wt. % dextrose. More than about 30% dextrose can increase browning during baking. In certain embodiments, the anticaking agent comprises more than 0.2 wt. % glucose oxidase. In certain embodiments, the anticaking agent comprises less than 0.8 wt. % glucose oxidase. In certain embodiments, the anticaking agent comprises less than 0.4 wt. % glucose oxidase.

The present disclosure also provides an anticaking agent comprising 0.5 wt. % and 2 wt. % of a salt. When the salt is added to the glucose oxidase/dextrose oxygen scavenging system, the rate of oxygen draw down increases, especially when the salt is sodium chloride. Without wishing to be bound by theory, the salt increased the rate of oxygen draw down by accelerating aerobic respiration in active cultures within the divided cheese product. The salt may also be drawing out more moisture from the divided cheese product, thus providing more water to fuel the oxygen scavenging system.

In certain embodiments, the anticaking agent comprises between as about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, or about 2.0 wt. % salt. In certain embodiments, the salt is chosen from sodium chloride, calcium chloride, potassium chloride, and magnesium chloride. In certain embodiments, the salt is sodium chloride. In certain embodiments, the salt is calcium chloride. In certain embodiments, the salt is potassium chloride. In certain embodiments, the salt is magnesium chloride.

The term "dairy ingredient" as used herein refers to products or byproducts obtained from processing milk. In certain embodiments, the dairy ingredients consist essentially of one or more constituents of milk, namely, milk proteins, milk fat, lactose and/or milk minerals. In various embodiments, the dairy ingredient is chosen from milk permeate powder, whey permeate powder, cheese whey powder, sweet dairy whey powder, non-hygroscopic dried whey, acid whey powder, whey protein concentrate, whey protein isolate, milk protein concentrate, milk protein isolate, whey cream, whey protein-lipid concentrate, rennet casein, calcium caseinate, sodium caseinate, milk minerals, milk calcium, milk calcium phosphate, lactose, skim milk powder, non-fat dry milk, acid casein, and combinations thereof. For example, the one or more dairy ingredient may be chosen from milk permeate powder, whey permeate powder, dried whey, and combinations thereof. In certain embodiments, the dairy ingredient is dairy product solids. In certain embodiments, the dairy ingredient is dairy product solids (DPS), which consists essentially of milk permeate powder, whey permeate powder, deproteinized whey, and combinations thereof.

The term "non-dairy ingredient" as used herein refers to ingredients essentially free from milk components. In various embodiments, the non-dairy ingredient is chosen from cellulose, modified cellulose, calcium sulfate, calcium phosphate, dicalcium phosphate, tricalcium phosphate, silicon dioxide, native starch, modified starch, bentonite, and combinations thereof. In certain embodiments, in the one or more non-dairy ingredient is chosen from cellulose, sugarcane fiber, calcium sulfate, calcium phosphate, dicalcium phosphate, silicon dioxide, starch, dextrose monohydrate, glucose oxidase, natamycin, potassium sorbate, mineral oil, high oleic sunflower oil, and combinations thereof.

In certain embodiments, the anticaking agent comprises 3-99 wt. % one or more non-dairy ingredients, such as between 3 wt. % and 5 wt. %, between 5 wt. % and 10 wt. %, between 10 wt. % and 15 wt. %, between 15 wt. % and 20 wt. %, between 20 wt. % and 25 wt. %, between 30 wt. % and 35 wt. %, between 35 wt. % and 40 wt. %, between 40 wt. % and 45 wt. %, between 45 wt. % and 50 wt. %, between 50 wt. % and 55 wt. %, between 55 wt. % and 60 wt. %, between 60 wt. % and 65 wt. %, between 65 wt. % and 70 wt. %, between 70 wt. % and 75 wt. %, between 75 wt. % and 80 wt. %, between 80 wt. % and 85 wt. %, between 85 wt. % and 90 wt. %, between 90 wt. % and 95 wt. %, about 96 wt. %, about 97 wt. %, about 98 wt. %, or about 99 wt. % one or more non-dairy ingredients. In certain embodiments, the anticaking agent comprises more than 30 wt. % one or more non-dairy ingredients. In certain embodiments, the anticaking agent comprises less than 60 wt. % one or more non-dairy ingredients.

In certain embodiments, the anticaking agent comprises 1-15 wt. % calcium sulfate, such as 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, or 15 wt. % calcium sulfate. In certain embodiments, the anticaking agent comprises 10 wt. % calcium sulfate. In certain embodiments, the anticaking agent comprises 2 wt. % calcium sulfate. In certain embodiments, the anticaking agent comprises more than 2 wt. % calcium sulfate. In certain embodiments, the anticaking agent comprises more than 5 wt. % calcium sulfate. In certain embodiments, the anticaking agent comprises less than 15 wt. % calcium sulfate.

In certain embodiments, the anticaking agent comprises 1-15 wt. % calcium phosphate, such as 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, or 15 wt. % calcium phosphate. In certain embodiments, the anticaking agent comprises 10 wt. % calcium phosphate. In certain embodiments, the anticaking agent comprises 2 wt. % calcium phosphate. In certain embodiments, the anticaking agent comprises more than 2 wt. % calcium phosphate. In certain embodiments, the anticaking agent comprises more than 5 wt. % calcium phosphate. In certain embodiments, the anticaking agent comprises less than 15 wt. % calcium phosphate. The calcium phosphate may be monocalcium phosphate ($Ca(H_2PO_4)_2$), dicalcium phosphate ($Ca_2(HPO_4)_2$) or tricalcium phosphate ($Ca_3(PO_4)_2$), or combinations thereof.

In certain embodiments, the anticaking agent comprises 1-15 wt. % tricalcium phosphate, such as 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, or 15 wt. % tricalcium phosphate. In certain embodiments, the anticaking agent comprises 10 wt. % tricalcium phosphate. In certain embodiments, the anticaking agent comprises 2 wt. % tricalcium phosphate. In certain embodiments, the anticaking agent comprises more than 2 wt. % tricalcium phosphate. In certain embodiments, the anticaking agent comprises more than 5 wt. % tricalcium phosphate. In certain embodiments, the anticaking agent comprises less than 15 wt. % tricalcium phosphate.

In certain embodiments, the anticaking agent comprises 3-99 wt. % cellulose, such as between 9 between 3 wt. % and 5 wt. %, between 5 wt. % and 10 wt. %, between 10 wt. % and 15 wt. %, between 15 wt. % and 20 wt. %, between 20 wt. % and 25 wt. %, between 30 wt. % and 35 wt. %, between 35 wt. % and 40 wt. %, between 40 wt. % and 45 wt. %, between 45 wt. % and 50 wt. %, between 50 wt. % and 55 wt. %, between 55 wt. % and 60 wt. %, between 60 wt. % and 65 wt. %, between 65 wt. % and 70 wt. %, between 70 wt. % and 75 wt. %, between 75 wt. % and 80 wt. %, between 80 wt. % and 85 wt. %, between 85 wt. % and 90 wt. %, between 90 wt. % and 95 wt. %, about 96 wt. %, about 97 wt. %, about 98 wt. %, or about 99 wt. % cellulose. In certain embodiments, the anticaking agent comprises more than 9.5 wt. % cellulose. In certain embodiments, the anticaking agent comprises less than 40 wt. % cellulose.

In certain embodiments, the anticaking agent comprises 48-99 wt. % starch, such as between 48 wt. % and 50 wt. %, between 50 wt. % and 55 wt. %, between 55 wt. % and 60 wt. %, between 60 wt. % and 65 wt. %, between 65 wt. % and 70 wt. %, between 70 wt. % and 75 wt. %, between 75 wt. % and 80 wt. %, between 80 wt. % and 85 wt. %, between 85 wt. % and 90 wt. %, between 90 wt. % and 95 wt. %, about 96 wt. %, about 97 wt. %, about 98 wt. %, or about 99 wt. % starch. In certain embodiments, the anticaking agent comprises 30-51 wt. % starch, such as between 30 wt. % and 35 wt. %, between 35 wt. % and 40 wt. %, between 40 wt. % and 45 wt. %, between 45 wt. % and 50 wt. %, or between 50 wt. % and 51 wt. % starch. In certain embodiments, the anticaking agent comprises more than 30 wt. % starch. In certain embodiments, the anticaking agent comprises less than 51 wt. % starch.

As used herein the term "starch" refers to any material comprising the complex polysaccharide carbohydrates of plants, comprising amylose and amylopectin with the formula $(C_6H_{10}O_5)_x$, wherein x can be any number. In various embodiments, the starches used herein are native starches and/or are starches that have been modified by cross-linking, derivatization, substitution, or other processes that involve chemical treatment to impart desired functional properties. In certain embodiments, the modified starches are cross-linked starches, which may comprise a native starch that has been cross-linked via any suitable cross-linking technique known in the art or otherwise found to be suitable in conjunction with the disclosed compositions. In a specific embodiment, the modified starch is distarch phosphate with and without substitution using any type of native starch or acid or enzyme modified starches with or without cross-linking and/or substitution.

A "resistant starch" is the sum of starch and products of starch degradation not absorbed in the small intestine of a healthy human being. Resistant starch occurs naturally in foods but may also be added to foods as isolated or manufactured types of resistant starch.

Resistant starch has been categorized into four types:
RS1—Physically inaccessible or undigestible resistant starch, such as that found in seeds or legumes and unprocessed whole grains;
RS2—Resistant starch is inaccessible to enzymes due to starch conformation, as in high amylose corn starch;
RS3—Resistant starch that is formed when starch-containing foods are cooked and cooled, such as pasta. Occurs due to retrogradation, which refers to the collective processes of dissolved starch becoming less soluble after being heated and dissolved in water and then cooled; and
RS4—Starches that have been chemically modified to resist digestion.

Some resistant starches (RS1, RS2 and RS3) are fermented by the large intestinal microbiota, conferring benefits to human health by producing short-chain fatty acids, increasing bacterial mass, and producing butyrate-producing bacteria. Starches with high amylose content generally have increased resistant starch.

Suitable examples of native starch include, but are not limited to, cereal starch, potato starch and legume starch, such as Irish potato starch, sweet potato starch, tapioca starch, cornstarch, rice starch, wheat starch, sorghum starch and the like; typical examples of starch derivatives are dextrin, cross-linked starch and the like. Regardless of the starch-containing material from which the starch and its derivatives are derived, and the form of the starch (e.g. a straight-chain starch or a branched starch), D-glucose bonded with α-1,4-glucoside or α-1,6-glucoside linkage constitutes the fundamental structure, and thus starch and its derivatives either those described above or those not mentioned here may be applicable.

In various embodiments, the starch is chosen from corn starch, potato starch, wheat starch, rice starch, sago starch, tapioca starch, and sorghum starch. In certain embodiments, the starch is corn starch. In certain embodiments, the starch is potato starch.

In certain embodiments, the anticaking agent comprises 25-30.2 wt. % sugarcane fiber, such as 25 wt. %, 26 wt. %, 27 wt. %, 28 wt. %, 29 wt. %, 30 wt. %, 30.1 wt. %, or 30.2 wt. % sugarcane fiber. In certain embodiments, the anticaking agent comprises more than 25 wt. % sugarcane fiber. In certain embodiments, the anticaking agent comprises less than 30.2 wt. % sugarcane fiber.

"Sugarcane fiber" or "bagasse" is the fibrous matter that remains after sugarcane or is crushed to extract its juice. Typical washed and dried sugarcane fiber comprises 45-55% cellulose, 20-25% hemicellulose, 18-24% lignin, 1-4% ash, and less than 1% waxes. Sugarcane fiber begins as a heterogeneous material containing about 30-40% "pith" fiber, which is derived from the core of the plant and is mainly parenchyma material, and "bast," "rind," or "stem" fiber, which comprises the balance and is largely derived from sclerenchyma material. Sugarcane fiber is a soluble fiber.

In certain embodiments, the anticaking agent comprises an antimycotic, such as natamycin. In certain embodiments, the anticaking agent comprises 0.01-0.085 wt. % natamycin, such as 0.01 wt. %, 0.02 wt. %, 0.03 wt. %, 0.04 wt. %, 0.05 wt. %, 0.06 wt. %, 0.07 wt. %, 0.08 wt. %, or 0.085 wt. % natamycin. In certain embodiments, the anticaking agent comprises more than 0.01 wt. % natamycin. In certain embodiments, the anticaking agent comprises more than 0.02 wt. % natamycin. In certain embodiments, the anticaking agent comprises more than 0.03 wt. % natamycin. In certain embodiments, the anticaking agent comprises more than 0.04 wt. % natamycin. In certain embodiments, the anticaking agent comprises more than 0.06 wt. % natamycin. In certain embodiments, the anticaking agent comprises less than 0.08 wt. % natamycin. In certain embodiments, the anticaking agent comprises less than 0.085 wt. % natamycin.

In certain embodiments, the anticaking agent comprises 10 wt. % potassium sorbate. In certain embodiments, the anticaking agent comprises 0.01-1.5 wt. % silicon dioxide (silica), such as between 0.01 wt. % and 0.1 wt. %, between 0.1 wt. % and 0.2 wt. %, between 0.2 wt. % and 0.3 wt. %, between 0.3 wt. % and 0.4 wt. %, between 0.4 wt. % and 0.5 wt. %, between 0.5 wt. % and 0.6 wt. %, between 0.6 wt. % and 0.7 wt. %, between 0.7 wt. % and 0.8 wt. %, between 0.8 wt. % and 0.9 wt. %, between 0.9 wt. % and 1.0 wt. %, between 1.0 wt. % and 1.1 wt. %, between 1.1 wt. % and 1.2 wt. %, between 1.2 wt. % and 1.3 wt. %, between 1.3 wt. % and 1.4 wt. %, or between 1.4 wt. % and 1.5 wt. % silicon dioxide. In certain embodiments, the anticaking agent comprises 0.02 wt. % silicon dioxide. In certain embodiments, the anticaking agent comprises more than 0.1 wt. % silicon dioxide. In certain embodiments, the anticaking agent comprises less than 1.5 wt. % silicon dioxide. The silicon dioxide (silica) may be Sipernat™ by Evonik, such as Sipernat™ 22LS or Sipernat™ 50 S. Sipernat™ 22LS has spherical particles, low fines content and high oil absorption (DBP) supplied by Evonik Industries. Sipernat™ combines high absorption capacity for liquids with high bulk density and very good flow properties.

In certain embodiments, the anticaking agent comprises 0.01-5 wt. % mineral oil, such as between 0.01 wt. % and 0.05 wt. %, between 0.05 wt. % and 0.1 wt. %, between 0.1 wt. % and 0.15 wt. %, between 0.15 wt. % and 0.2 wt. %, between 0.2 wt. % and 0.25 wt. %, between 0.25 wt. % and 0.3 wt. %, between 0.3 wt. % and 0.35 wt. %, between 0.35 wt. % and 0.4 wt. %, between 0.4 wt. % and 0.45 wt. %, between 0.45 wt. % and 0.5 wt. %, between 0.5 wt. % and 0.75 wt. %, between 0.75 wt. % and 1.0 wt. %, between 1.0 wt. % and 1.25 wt. %, between 1.25 wt. % and 1.5 wt. %, between 1.5 wt. % and 1.75 wt. %, between 1.75 wt. % and 2.0 wt. %, between 2.0 wt. % and 2.25 wt. %, between 2.25 wt. % and 2.5 wt. %, between 2.5 wt. % and 2.75 wt. %, between 2.75 wt. % and 3.0 wt. %, between 3.0 wt. % and 3.25 wt. %, between 3.25 wt. % and 3.5 wt. %, between 3.5 wt. % and 3.75 wt. %, between 3.75 wt. % and 4.0 wt. %, between 4.0 wt. % and 4.25 wt. %, between 4.25 wt. % and 4.5 wt. %, between 4.5 wt. % and 4.75 wt. %, or between 4.75 wt. % and 5.0 wt. % mineral oil. In certain embodiments, the anticaking agent comprises 0.04-0.5 wt. % mineral oil, such as 0.04 wt. %, between 0.05 wt. % and 0.1 wt. %, between 0.1 wt. % and 0.15 wt. %, between 0.15 wt. % and 0.2 wt. %, between 0.2 wt. % and 0.25 wt. %, between 0.25 wt. % and 0.3 wt. %, between 0.3 wt. % and 0.35 wt. %, between 0.35 wt. % and 0.4 wt. %, between 0.4 wt. % and 0.45 wt. %, or between 0.45 wt. % and 0.5 wt. % mineral oil. In certain embodiments, the anticaking agent comprises more than 0.01 wt. % mineral oil. In certain embodiments, the anticaking agent comprises more than 0.05 wt. % mineral oil. In certain embodiments, the anticaking agent comprises less than 5 wt. % mineral oil. In certain embodiments, the anticaking agent comprises less than 0.5 wt. % mineral oil.

In certain embodiments, the anticaking agent comprises 1.0-5.0 wt. % high-oleic sunflower oil (HOSFO), such as between 1.0 wt. % and 1.5 wt. %, between 1.0 wt. % and 1.5 wt. %, between 1.0 wt. % and 1.5 wt. %, between 1.0 wt. % and 1.5 wt. %, between 1.0 wt. % and 1.5 wt. %, between 1.0 wt. % and 1.5 wt. %, between 1.0 wt. % and 1.5 wt. %, or between 1.0 wt. % and 1.5 wt. % high oleic sunflower oil. In certain embodiments, the anticaking agent comprises 4.6 wt. % high-oleic sunflower oil. In certain embodiments, the anticaking agent comprises more than 1.0 wt. % high-oleic sunflower oil. In certain embodiments, the anticaking agent comprises less than 5.0 wt. % high-oleic sunflower oil.

In certain embodiments, the anticaking agent is essentially free of clays, such as bentonite. In certain embodiments, the anticaking agent is essentially free of metal carbonates, such as calcium carbonate. In certain embodiments, the anticaking agent is essentially free of silicon dioxide. In certain embodiments, the anticaking agent is essentially free of cellulose. In certain embodiments, the anticaking agent is essentially free of cellulose and metal carbonates.

Food Product

The present disclosure also provides a food product comprising: divided cheese comprising a plurality of individual cheese particles; and an anticaking agent disclosed herein dispersed on the individual cheese particles in an amount sufficient to inhibit caking of the individual cheese particles. In certain embodiments, the anticaking agent is applied at up to 10 wt. % of the product.

In various embodiments, the anticaking agent is applied to divided cheese at between 0.1 wt. % and 10 wt. %. In various embodiments, the anticaking agent is applied to divided cheese at about 1 wt. %. In various embodiments, the anticaking agent is applied to divided cheese at about 2 wt. %. In various embodiments, the anticaking agent is applied to divided cheese at about 3 wt. %. In various embodiments, the anticaking agent is applied to divided cheese at about 4 wt. %. In various embodiments, the anticaking agent is applied to divided cheese at about 5 wt. %. In various embodiments, the anticaking agent is applied to divided cheese at about 6 wt. %. In various embodiments, the anticaking agent is applied to divided cheese at about 7 wt. %. In various embodiments, the anticaking agent is applied to divided cheese at about 8 wt. %. In various embodiments, the anticaking agent is applied to divided cheese at about 9 wt. %. In various embodiments, the anticaking agent is applied to divided cheese at about 10 wt. %.

The articles "a", "an", "the" and "said" are intended to mean that there are one or more of the elements. The terms "comprising", "including" and "having" are intended to be inclusive and mean that there may be additional elements other than the listed elements.

The term "and/or" when used in a list of two or more items, means that any one of the listed items can be employed by itself or in combination with any one or more of the listed items. For example, the expression "A and/or B" is intended to mean either or both of A and B, i.e. A alone, B alone or A and B in combination. The expression "A, B and/or C" is intended to mean A alone, B alone, C alone, A and B in combination, A and C in combination, B and C in combination or A, B, and C in combination.

After reading this description, it will become apparent to one skilled in the art how to implement the disclosure in various alternative embodiments and alternative applications. However, although various embodiments of the present disclosure will be described herein, it is understood that these embodiments are presented by way of example only, and not limitation. As such, this detailed description of various alternative embodiments should not be construed to limit the scope or breadth of the present disclosure as set forth in the appended claims.

EXAMPLES

Example 1—Anticake Compositions with an Oxygen-Scavenging System

To make the oxygen scavenging system more powerful and react more rapidly, the following changes were tested to prior known systems: (1) increase dextrose level in the anticaking agent up to 35 wt. % (Table 1), (2) increase glucose oxidase enzyme level in the anticaking agent up to 0.8 wt. % (Table 3), and (3) include salt in the anticaking agent up to 2 wt. % (Table 2). For comparison, anticaking agents were also prepared various chloride salts and dextrose but not enzyme (Table 4).

TABLE 1

Anticaking agents with various levels of dextrose, enzyme and salt

| Ingredient | 1 | 2 | 3 | 4 | 5 |
|---|---|---|---|---|---|
| Potato Starch | 53.7% | 48.721% | 48.621% | 33.082% | 32.682% |
| Low Moisture Potato Starch | 36.3% | 31.17% | 31.17% | 32.50% | 32.40% |
| Dextrose | 10.00% | 20.00% | 20.00% | 25.00% | 25.00% |
| Calcium Sulfate | — | — | — | 9.025% | 9.025% |
| Natamycin | — | — | — | 0.033% | 0.033% |
| Glucose Oxidase | 0.10% | 0.10% | 0.20% | 0.30% | 0.30% |
| Sodium Chloride | — | — | — | — | 0.50% |
| Mineral Oil | 0.009% | 0.009% | 0.009% | 0.06% | 0.06% |

TABLE 2

Anticaking agents with different amounts of salt

| Ingredient | 6 | 7 | 8 | 9 | 10 |
|---|---|---|---|---|---|
| Potato starch | 33.082% | 32.682% | 32.332% | 32.082% | 31.982% |
| Corn starch | 32.50% | 32.40% | 32.25% | 32.00% | 31.70% |
| Dextrose | 25.00% | 25.00% | 25.00% | 25.00% | 25.00% |
| Calcium Sulfate | 9.025% | 9.025% | 9.025% | 9.025% | 9.025% |
| Natamycin | 0.033% | 0.033% | 0.033% | 0.033% | 0.033% |

TABLE 2-continued

Anticaking agents with different amounts of salt

| Ingredient | 6 | 7 | 8 | 9 | 10 |
|---|---|---|---|---|---|
| Glucose Oxidase | 0.30% | 0.30% | 0.30% | 0.30% | 0.30% |
| Sodium Chloride | — | 0.50% | 1.00% | 1.50% | 1.90% |
| Mineral Oil | 0.06% | 0.06% | 0.06% | 0.06% | 0.06% |

TABLE 3

Anticaking agents with glucose oxidase up to 0.8 wt. %

| Ingredient | Control | 11 | 12 | 13 | 14 | 15 | 16 |
|---|---|---|---|---|---|---|---|
| Potato Starch | 99.875% | 73.575% | 73.075% | 74.585% | 73.585% | 73.385% | 73.085% |
| Dextrose | — | 25.00% | 25.00% | 25.00% | 25.00% | 25.00% | 25.00% |
| Natamycin | 0.08% | 0.080% | 0.080% | 0.08% | 0.08% | 0.08% | 0.08% |
| Glucose Oxidase | — | 0.300% | 0.300% | 0.30% | 0.30% | 0.50% | 0.80% |
| Sodium Chloride | — | 1.00% | 1.50% | — | 1.00% | 1.00% | 1.00% |
| Mineral Oil | 0.025% | 0.025% | 0.025% | 0.025% | 0.025% | 0.025% | 0.025% |
| Silicon Dioxide | 0.02% | 0.02% | 0.02% | 0.01% | 0.01% | 0.01% | 0.01% |

| Ingredient | 17 | 18 | 19 | 20 |
|---|---|---|---|---|
| Potato Starch | 69.585% | 68.585% | 68.385% | 68.085% |
| Dextrose | 30.00% | 30.00% | 30.00% | 30.00% |
| Natamycin | 0.08% | 0.08% | 0.08% | 0.08% |
| Glucose Oxidase | 0.30% | 0.30% | 0.50% | 0.80% |
| Sodium Chloride | — | 1.00% | 1.00% | 1.00% |
| Mineral Oil | 0.025% | 0.025% | 0.025% | 0.025% |
| Silicon Dioxide | 0.01% | 0.01% | 0.01% | 0.01% |

| Ingredient | 21 | 22 | 23 | 24 |
|---|---|---|---|---|
| Potato Starch | 64.585% | 63.585% | 63.385% | 63.085% |
| Dextrose | 35.00% | 35.00% | 35.00% | 35.00% |
| Natamycin | 0.08% | 0.08% | 0.08% | 0.08% |
| Glucose Oxidase | 0.30% | 0.30% | 0.50% | 0.80% |
| Sodium Chloride | — | 1.00% | 1.00% | 1.00% |
| Mineral Oil | 0.025% | 0.025% | 0.025% | 0.025% |
| Silicon Dioxide | 0.01% | 0.01% | 0.01% | 0.01% |

TABLE 4

Anticaking agent with dextrose and salt but no enzyme

| | Control | 25 | 26 | 27 | 28 | 29 | 30 |
|---|---|---|---|---|---|---|---|
| Potato starch | 99.875% | 74.385% | 73.885% | 73.385% | 74.62% | 73.885% | 74.585% |
| Dextrose | — | 25.00% | 25.00% | 25.00% | 25.00% | 25.00% | 25.00% |
| Natamycin | 0.08% | 0.08% | 0.08% | 0.08% | 0.08% | 0.08% | 0.08% |
| Glucose Oxidase | — | — | — | — | — | — | — |
| Sodium Chloride | — | 0.50% | 1.00% | 1.50% | — | — | — |
| Calcium Chloride | — | — | — | — | 0.30% | — | — |
| Magnesium Chloride | — | — | — | — | — | 1.00% | 0.30% |
| Mineral Oil | 0.025% | 0.025% | 0.025% | 0.025% | — | 0.025% | 0.025% |
| Silicon Dioxide | 0.02% | 0.01% | 0.01% | 0.01% | — | 0.01% | 0.01% |

Samples of the anticaking agents 1 to 28 from Tables 1-4 were tested for their oxygen draw down rate. Store bought mozzarella cheese (moisture around 47%, water activity around 0.96) and cheddar cheese (moisture around 35%, water activity around 0.945) were shredded and coated with anticaking agent at 4% usage rate. The percentage of gaseous oxygen was measured using an oxygen analyzer.

Figure 2:
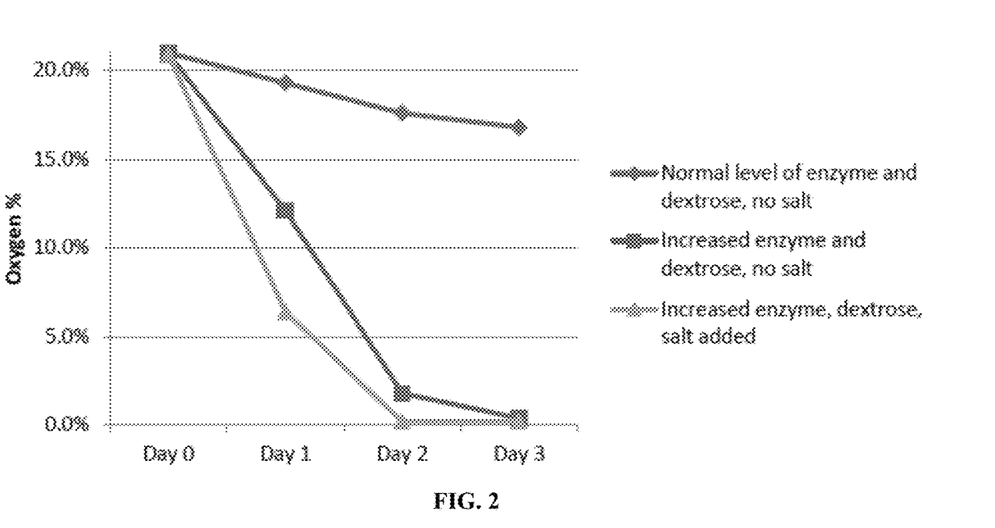
FIG. 2 depicts oxygen level in well-sealed cheese packages mozzarella shreds, using anticake at a load rate of 4 wt. %.
Figure 3:
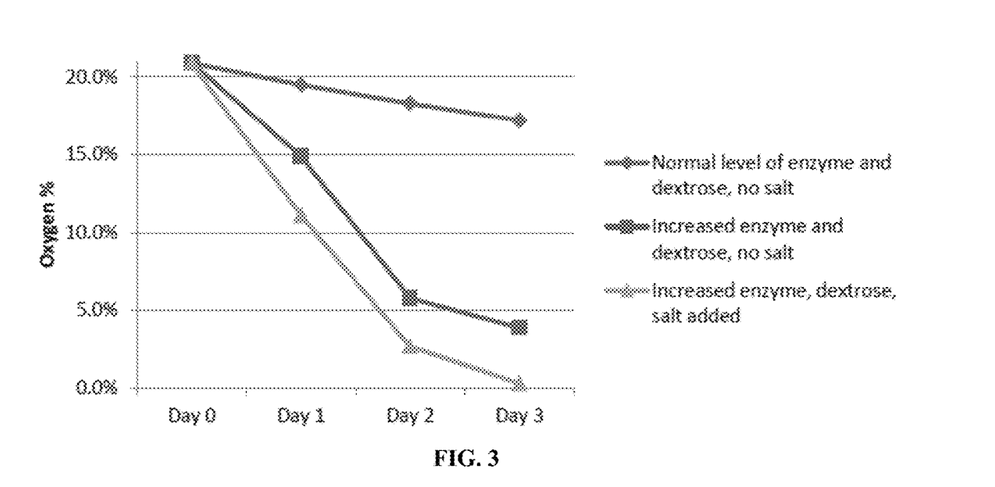
FIG. 3 depicts oxygen level in well-sealed cheese packages cheddar shreds, using anticake at a load rate of 4 wt. %.

Data showed that increasing the levels of enzyme and dextrose in the formulations accelerated the oxygen draw down rate. See FIGS. 2 and 3 and Table 5, anticakes 1-4. The control in each study used no oxygen scavenger. Dextrose and enzyme levels were varied within anticaking agents to test how they affected the oxygen draw down. At the onset of the measurement (Day 0), the oxygen content was the same as the atmosphere, with 20.9% oxygen. As a point of reference, the typical oxygen level after gas flush is around 2% to 5% in sealed bags of cheese. The oxygen level a Days 1-3 will stay about the same as Day 0 if no oxygen scavengers are used, but will creep up over time due permeability of the atmosphere through the bag.

Increased enzyme level accelerated oxygen draw down rate when dextrose and salt were held constant. At 0.8 wt. % enzyme, oxygen was down to <0.5% in a day in mozzarella and 2 days in cheddar. See Tables 5 and 6. Thus, the higher the water content and activity in the cheese, the faster the oxygen draw down rate for the same anticaking agent.

Anticake 5 showed that adding salt further accelerated the oxygen draw down rate, making the oxygen scavenging system react even faster. This acceleration was observed even when dextrose and enzyme levels were held constant (Tables 6 & 7). More than 1 wt. % sodium chloride did not further accelerate draw down. Greater than 2 wt. % sodium chloride negatively impacted taste quality of the coated cheese product.

TABLE 5

Percentage of oxygen remaining inside cheese packages

|  | Control | 1 | 2 | 3 | 4 | 5 |
|---|---|---|---|---|---|---|
| Day 0 | 20.9% | 20.9% | 20.9% | 20.9% | 20.9% | 20.9% |
| Day 1 | 20.3% | 19.3% | 17.6% | 14.0% | 9.1% | 2.2% |
| Day 2 | 20.7% | 18.5% | 14.4% | 11.0% | 0.4% | 0.3% |
| Day 3 | 20.0% | 17.5% | 13.2% | 3.3% | 0.4% | 0.3% |

TABLE 6

Percentage of oxygen remaining inside mozzarella packages (4 wt. % addition)

|  | Control | 6 | 7 | 8 | 9 | 10 |
|---|---|---|---|---|---|---|
| Day 0 | 20.9% | 20.9% | 20.9% | 20.9% | 20.9% | 20.9% |
| Day 1 | 20.2% | 2.8% | 0.6% | 6.5% | 2.1% | 0.5% |
| Day 2 | 20.0% | 0.4% | 0.3% | 0.2% | 0.2% | 0.2% |

Cheese water content was 48.02%, $a_w$ = 0.9673

TABLE 7

Percentage of oxygen remaining inside medium cheddar packages (4 wt. % addition)

|  | Control | 6 | 7 | 8 | 9 | 10 |
|---|---|---|---|---|---|---|
| Day 0 | 20.9% | 20.9% | 20.9% | 20.9% | 20.9% | 20.9% |
| Day 1 | 20.8% | 14.9% | 11.1% | 11.1% | 10.2% | 11.2% |
| Day 2 | 20.6% | 5.8% | 7.1% | 2.7% | 2.0% | 7.7% |
| Day 3 | 20.7% | 3.9% | 3.5% | 0.3% | 0.2% | 1.7% |

Cheese water content was 36.99%, $a_w$ = 0.9567

Increased dextrose level accelerated oxygen draw down rate when the enzyme was up to 0.5 wt. % and salt held constant. When enzyme was at 0.8 wt. %, all three levels of dextrose studied (25%, 30%, 35%) showed no difference in oxygen draw down rate (Tables 8 & 9). Too much dextrose in anticake can contribute to excess browning in pizza baking.

TABLE 8

Percentage of oxygen remaining inside mozzarella packages (4 wt. % addition)

|  | Cheese only | Control | 11 | 12 | 13 | 14 | 15 | 16 |
|---|---|---|---|---|---|---|---|---|
| Day 0 | 20.9% | 20.9% | 20.9% | 20.9% | 20.9% | 20.9% | 20.9% | 20.9% |
| Day 1 | 20.5% | 20.7% | 6.5% | 2.1% | 9.9% | 7.0% | 4.0% | 0.4% |
| Day 2 | 20.3% | 20.2% | 0.2% | 0.2% | 4.2% | 0.3% | 0.4% | 0.2% |

|  | 17 | 18 | 19 | 20 | 21 | 22 | 23 | 24 |
|---|---|---|---|---|---|---|---|---|
| Day 0 | 20.9% | 20.9% | 20.9% | 20.9% | 20.9% | 20.9% | 20.9% | 20.9% |
| Day 1 | 5.7% | 4.4% | 3.4% | 0.3% | 7.8% | 2.0% | 0.4% | 0.2% |
| Day 2 | 2.2% | 0.5% | 0.3% | 0.2% | 1.0% | 0.3% | 0.2% | 0.2% |

Cheese water content was 48.69%, $a_w$ = 0.9620

TABLE 9

Percentage of oxygen remaining inside cheddar packages (4 wt. % addition)

|  | Cheese only | Control | 11 | 12 | 13 | 14 | 15 | 16 |
|---|---|---|---|---|---|---|---|---|
| Day 0 | 20.9% | 20.9% | 20.9% | 20.9% | 20.9% | 20.9% | 20.9% | 20.9% |
| Day 1 | 20.7% | 20.6% | 11.1% | 10.2% | 15.2% | 12.5% | 6.9% | 5.8% |
| Day 2 | 20.4% | 20.4% | 2.7% | 2.0% | 11.7% | 4.0% | 1.7% | 0.5% |
| Day 3 | 20.5% | 20.5% | 0.3% | 0.2% | 10.7% | 0.4% | 0.4% | 0.4% |

|  | 17 | 18 | 19 | 20 | 21 | 22 | 23 | 24 |
|---|---|---|---|---|---|---|---|---|
| Day 0 | 20.9% | 20.9% | 20.9% | 20.9% | 20.9% | 20.9% | 20.9% | 20.9% |
| Day 1 | 11.8% | 9.3% | 4.0% | 5.2% | 5.4% | 11.6% | 8.7% | 1.3% |
| Day 2 | 0.5% | 4.4% | 0.3% | 0.4% | 0.8% | 3.1% | 0.4% | 0.2% |
| Day 3 | 0.3% | 0.3% | 0.3% | 0.2% | 1.3% | 0.8% | 0.2% | 0.4% |

Cheese water content was 37.83%, $a_w$ = 0.9532

Salts alone with dextrose without enzyme did not draw down oxygen beyond that measured in the controls. This outcome was true for sodium chloride (Table 10, anticakes 25-27), calcium chloride (anticake 28) and magnesium chloride (anticakes 29 and 30), even after waiting 10 days. A 4 wt. % loading of anticaking agent was used in each test. The water content for the mozzarella was 47.69% with an $a_w$ of 0.9656. The water content for the cheddar was 37.20% with an $a_w$ of 0.9514.

TABLE 10

Percentage of oxygen remaining inside packages using anticaking agent with salt and dextrose, but no enzyme.

| | Cheese only | Control | 25 | 26 | 27 | 28 | 29 | 30 |
|---|---|---|---|---|---|---|---|---|
| | | | Mozzarella | | | | | |
| Day 0 | 20.9% | 20.9% | 20.9% | 20.9% | 20.9% | 20.9% | 20.9% | 20.9% |
| Day 1 | 20.5% | 20.7% | 20.4% | 20.4% | 20.2% | 20.2% | 20.1% | 20.2% |
| Day 2 | 20.3% | 20.2% | 20.0% | 20.0% | 20.0% | 19.8% | 19.9% | 19.9% |
| | | | Cheddar | | | | | |
| Day 0 | 20.9% | 20.9% | 20.9% | 20.9% | 20.9% | 20.9% | 20.9% | 20.9% |
| Day 1 | 20.6% | 20.6% | 20.5% | 20.6% | 20.6% | 20.5% | 20.5% | 20.5% |
| Day 3 | 20.5% | 20.3% | 20.3% | 20.4% | 20.4% | 20.4% | 20.4% | 20.4% |
| Day 7 | 20.5% | 20.1% | 20.2% | 20.2% | 20.2% | 20.0% | 20.3% | 20.3% |
| Day 10 | 20.4% | 20.0% | 20.0% | 20.0% | 20.0% | 20.1% | 20.2% | 20.3% |

Thus, an anticaking agent comprising 15-30 wt. % reducing sugar, 0.2-0.8 wt. % glucose oxidase, and 0.5-2 wt. % salt chosen from sodium chloride, calcium chloride, and magnesium chloride drew down the oxygen within a sealed package of cheese enough to eliminate the need for modifying the atmosphere in the package before sealing it or using an inert gas flush.

Example 2: Anticaking Properties

Cheese samples were treated with the anticaking agents from Example 1, stored as 36° F., and monitored for oxygen content, color, flavor, cheese shred separation, shred appearance, melt, pH, moisture percentage and water activity. The color of the cheese was graded using National Cheese Institute Cheese Color Standards. Table 11 shows the tested properties of divided cheese with two exemplary anticake formulations.

TABLE 11

Properties of divided cheese products with anticaking agents 11 and 12.

| | | 11 | | | 12 | | |
|---|---|---|---|---|---|---|---|
| Feature | Time | Mozz | Ched | Parm | Mozz | Ched | Parm |
| Color | Month 0 | 1 | 7 | 1 | 1 | 7 | 1 |
| | Month 1 | 1 | 7 | 1 | 1 | 7 | 1 |
| | Month 2 | 1 | 7 | 1 | 1 | 7 | 1 |
| | Month 3 | 1 | 7 | 1 | 1 | 7 | 1 |
| Flavor | Month 0 | normal | normal | normal | normal | normal | normal |
| | Month 1 | normal | normal | normal | normal | normal | normal |
| | Month 2 | normal | normal | normal | normal | normal | normal |
| | Month 3 | normal | normal | normal | normal | normal | normal |
| $O_2$% | Month 0 | 20.9% | 20.9% | 20.9% | 20.9% | 20.9% | 20.9% |
| | Month 1 | 0.3% | 0.3% | 0.2% | 0.4% | 0.3% | 0.2% |
| | Month 2 | 0.3% | 0.3% | 0.3% | 0.3% | 0.2% | 0.2% |
| | Month 3 | 0.2% | 0.2% | 0.2% | 0.2% | 0.2% | 0.2% |
| Caking | Month 0 | No | No | No | No | No | No |
| | Month 1 | No | No | No | No | No | No |
| | Month 2 | No | No | No | No | No | No |
| | Month 3 | No | No | No | No | No | No |

TABLE 11-continued

Properties of divided cheese products with anticaking agents 11 and 12.

| | | 11 | | | 12 | | |
|---|---|---|---|---|---|---|---|
| Feature | Time | Mozz | Ched | Parm | Mozz | Ched | Parm |
| Cracks | Month 0 | No | No | No | No | No | No |
| | Month 1 | No | No | No | No | No | No |
| | Month 2 | No | No | No | No | No | No |
| | Month 3 | No | No | No | No | No | No |
| Melt | Month 0 | Good | Good | Good | Good | Good | Good |
| | Month 1 | Good | Good | Good | Good | Good | Good |
| | Month 2 | Good | Good | Good | Good | Good | Good |
| | Month 3 | Good | Good | Good | Good | Good | Good |
| Yeast/Mold | Month 0 | No | No | No | No | No | No |
| (visual) | Month 1 | No | No | No | No | No | No |
| | Month 2 | No | No | No | No | No | No |
| | Month 3 | No | No | No | No | No | No |
| pH | Month 0 | 5.31 | 5.55 | 5.33 | 5.46 | 5.54 | 5.4 |
| | Month 1 | 5.28 | 5.09 | 5.39 | 5.18 | 5.06 | 5.31 |
| | Month 2 | 5.25 | 5.12 | 5.34 | 5.22 | 5.08 | 5.32 |
| | Month 3 | 5.29 | 5.09 | 5.3 | 5.26 | 5.13 | 5.3 |
| $H_2O$ % | Month 0 | 46.28% | 35.19% | 30.29% | 46.04% | 34.77% | 29.77% |
| | Month 1 | 46.24% | 36.70% | 29.02% | 46.14% | 36.13% | 29.18% |
| | Month 2 | 46.33% | 36.08% | 29.29% | 45.83% | 35.68% | 29.45% |
| | Month 3 | 46.20% | 35.08% | 31.14% | 45.54% | 36.15% | 31.20% |
| $a_w$ | Month 0 | 0.9639 | 0.9476 | 0.9069 | 0.9599 | 0.9458 | 0.9103 |
| | Month 1 | 0.9555 | 0.9459 | 0.9089 | 0.9611 | 0.9403 | 0.9058 |
| | Month 2 | 0.9624 | 0.9458 | 0.9074 | 0.9599 | 0.9492 | 0.9079 |
| | Month 3 | 0.9582 | 0.9472 | 0.9065 | 0.9560 | 0.9476 | 0.9064 |

Example 3: Baking Properties

The properties of the anticaking compositions are studied via a series of iterative pizza cheese bake tests. Each bake test contains a control sample—cellulose added to shredded cheese at 1.5 wt. %, and experimental samples—anticaking blends at 4.0 wt. %. Results from each test are used to modify ingredient blends for subsequent tests. Visual examination of anticaking effectiveness was determined 1-2 days following addition to the shredded cheese. Anticaking blends that resulted in pizza cheese shreds sticking or lumping may be excluded from the bake tests.

Cheese is prepared with the anticaking compositions as follows:

1. Shred cheese using the use RobotCoupe™ R2 with grater #3 for cheddar (average shred diameter of 3 mm), and grater #6 for mozzarella (average shred diameter of 6 mm).
2. Weigh desired quantity of cheese.
3. Place cheese into a 60-ounce plastic container and add anticaking agent, either 1.5 wt. % cellulose powder or 4 wt. % experimental anticaking blend (pre-mixed).
4. Put a lid on the container and shake the container by hand until anticaking agent is incorporated into the shredded cheese (approximately 15 seconds).
5. Hold the shredded cheese with anticaking ingredients in the 60-ounce containers at 40° F. for 20-60 hours.

Browning, emulsion stability (oiling), and melt were evaluated in a standard convection oven at 450° F. Cheese shreds (57 g) were placed into a 6-inch metal ring on a cookie sheet. The ring removed before baking for five minutes. Melt was graded as Good (mostly or completely melted), Fair (some melted), or Poor (none melted). Other guidelines follow below in Table 12.

TABLE 12

Cheese Evaluation Guidelines

| 1 | Browning |
| | 10 No or very few small brown spots |
| | 8 Small brown spots about the size of a dime (1.8 cm diameter) |
| | 4 50% brown spots on the surface-some large, some small |
| | 1 95-100% covered with large (quarter-sized, 2.4 cm diameter) brown spots on the surface |
| 2 | Oiling |
| | 10 Slight oil sheen visible |
| | 8 Very few pools present, smaller than a dime (1.8 cm) |
| | 4 Slight pools present, larger than a dime (1.8 cm) |
| | 1 Many large pools present |
| 4 | Shred |
| | 10 Confluent-melting all together |
| | 8 Outline of shred still evident - 10% |
| | 5 Outline of shreds still evident - 30% |
| | 1 Little to no sign of melting |
| 5 | String - a 2 minutes until breakage |
| | Noted as the actual length of string when lifted with fork. |
| 6 | Flavor |
| | 10 Good flavor - no off tastes |
| | 5 Some off notes on flavor |
| | 1 Unacceptable flavor |
| 7 | Mouthfeel |
| | 10 Smooth tender body |
| | 8 Mostly soft or slightly chewy, but smooth |
| | 4 Moderately tough or chewy, mealy, grainy plastic mouthfeel |
| | 1 Extremely tough, excessive graininess, sandiness and/or chewiness |
| 8 | Appearance at 10 minutes |
| | 10 White or slight off-white |
| | 8 Slightly translucent |
| | 4 Moderately translucent |
| | 1 Very translucent |

Example 4: Antimicrobial Activity

A laboratory study evaluated the antimicrobial activity and applicability of glucose oxidase for controlling *Escherichia coli* (O157:H7), *Salmonella* spp. (SS) and *Listeria monocytogenes* (LM) in shredded cheese with experimental anticaking agents. Samples were sent to the Silliker Laboratories to test for total plate count, yeast and mold, coliform, E. Coli, Listeria, and Salmonella.

When used, bacterial cultures were obtained from the American Type Culture Collection, include three strains of Listeria monocytogenes (ATCC 19115, 19113, 19112), three strains of Salmonella, and three strains of Escherichia coli O157:H7(ATCC 35150, 43895, 51657). To prepare the inoculum, cultures were grown individually in 9 mL of Tryptic Soy Broth (TSB, Difco) for 24 h at 35° C. To inoculate each strain was combined into a single mixed culture suspension. The combined suspension was serially diluted at two inoculum levels to inoculate the shredded cheese. For the Salmonella and Listeria treatments, targeted low and high levels of inoculum were prepared and plated onto modified MOX agar (Oxoid, UK), and xylose lysine desoxycholate agar (XLD, Difco) incubated at 35° C. for 24 h to confirm target levels. For E. coli, targeted low and high levels of inoculum were prepared and plated onto MacConkey Sorbitol Agar (MSA) and incubated at 35° C. for 24 h to confirm target levels.

Each treatment was subjected to two different inoculum levels as subtreatments per bacterium:

Subtreatment 1: High Level Inoculum of L. monocytogenes+Salmonella spp. suspension ($10^8$)

Subtreatment 2: Low Level Inoculum of L. monocytogenes+Salmonella spp. suspension ($10^4$)

Subtreatment 1: High Level Inoculum of Salmonella spp. suspension ($10^8$)

Subtreatment 2: Low Level Inoculum of Salmonella spp. suspension ($10^4$)

Subtreatment 1: High Level Inoculum of E. coli O157:H7 ($10^8$)

Subtreatment 2: Low Level Inoculum of E. coli O157:H7 ($10^5$)

Nine hundred gram blocks of low moisture part skim Mozzarella cheese obtained from local grocery store were shredded using a food blender. One hundred grams cheese was then weighed into sterile polyethylene bags for treatment. All bags were heat sealed and stored at 4° C. until inoculation.

Each treatment group had 10 samples of 100 grams of shredded cheese in individual sterile zip lock bags (5 for each inoculum level or subtreatment). Samples were inoculated by adding 10 mL inoculum inside the bag. Bags were closed, shaken for 2 minutes, and then sealed closed. Five samples for each treatment were inoculated with a low level and the other five paired samples were inoculated with a high level of inoculum using corresponding combined suspensions of Escherichia coli (O157:H7), Salmonella spp. (SS) and Listeria monocytogenes (LM) inoculum respectively, as Subtreatments 1 (Low Inoculum) and 2 (High Inoculum), as indicated above.

After inoculation blends were added to the inoculated cheese samples by adding the recommended amounts of each blend into the bag. Bags were closed and manually shaken for 2 minutes to homogenize the sample, then all 10 bags from each treatment are stored at 4° C. Controls are run parallel to the experimental set.

Each treatment was enumerated for Escherichia coli (O157:H7), Salmonella spp. (SS) or Listeria monocytogenes (LM) populations just after inoculation (0D), and after 1 (1D), 3 (3D), 5 (5D), and 8 days (8D) of referred storage conditions. An aliquot of 10 grams of sample was aseptically obtained from each bag. The 10 grams of sample was added to 90 mL of 0.1% peptone diluent and homogenized by blending in a stomacher for 1 min. After homogenizing, samples are serially diluted and spread plated (0.1 ml) onto modified MOX agar (Oxoid, UK) for Listeria monocytogenes, and XLD agar for Salmonella spp., these plates are incubated at 35° C. for 48 h. For E. coli, samples are serially diluted and spread plated (0.1 mL) onto MacConkey Sorbitol Agar (MSA) and incubated at 35° C. for 24 h to confirm target levels. Recovered populations are calculated and reported as Log 10 CFU/g. Three replications of this study were performed.

Table 14 shows the results of the microbial testing of divided cheese products with anticaking agents 11 and 12.

TABLE 14

Microbial testing results for anticaking agents 11 and 12

| | | 11 | | | 12 | | |
|---|---|---|---|---|---|---|---|
| Feature | Time | Mozz | Ched | Parm | Mozz | Ched | Parm |
| Aerobic Plate Count (units/g) | Month 1 | <10 | 50 | 10 | 10 | 110 | 130 |
| | Month 2 | 10 | 140 | <10 | — | — | — |
| | Month 3 | <10 | 20 | <10 | — | — | — |
| Coliform (units/g) | Month 1 | <10 | <10 | <10 | <10 | <10 | <10 |
| | Month 2 | <10 | — | — | — | — | — |
| | Month 3 | <10 | — | — | — | — | — |
| E. Coli (units/g) | Month 1 | <10 | <10 | <10 | <10 | <10 | <10 |
| | Month 2 | <10 | — | — | — | — | — |
| | Month 3 | <10 | — | — | — | — | — |
| Yeast (units/g) | Month 1 | <10 | <10 | <10 | <10 | <10 | <10 |
| | Month 2 | <10 | <10 | <10 | — | — | — |
| | Month 3 | <10 | <10 | <10 | — | — | — |
| Mold (units/g) | Month 1 | <10 | <10 | <10 | <10 | <10 | <10 |
| | Month 2 | <10 | <10 | <10 | — | — | — |
| | Month 3 | <10 | <10 | <10 | — | — | — |
| Listeria (units/25 g) | Month 1 | None | None | None | None | None | None |
| | Month 2 | None | — | — | — | — | — |
| | Month 3 | None | — | — | — | — | — |
| Salmonellla (units/25 g) | Month 1 | None | None | None | None | None | None |
| | Month 2 | None | — | — | — | — | — |
| | Month 3 | None | — | — | — | — | — |

It is understood that the examples and embodiments described herein are for illustrative purposes only and that various modifications or changes in light thereof will be suggested to persons skilled in the art and are to be included within the spirit and purview of this application and scope of the appended claims. The compositions of the present invention may be made by the methods described herein, or by any other method that produces a finished product having the same physical or chemical properties as the present compositions. All publications, patents and patent applications cited herein are hereby incorporated by reference in their entirety for all purposes to the same extent as if each individual publication, patent or patent application were specifically and individually indicated to be so incorporated by reference.

What is claimed is:

1. A method for producing a package of cheese shreds, comprising:
   mixing cheese shreds and anticaking agent at a load between 2 wt. % and 10 wt. % in relation to the cheese shreds to form anticake-coated cheese shreds, the anticaking agent comprising 15-30 wt. % reducing sugar and 0.01-0.8 wt. % glucose oxidase; and
   sealing the anticake-coated cheese shreds into a package without modifying the atmosphere in the package or using an inert gas flush,
   wherein the concentration of oxygen in the sealed package is less than 0.5% within 3 days of being sealed.

2. The method of claim 1, wherein the reducing sugar is dextrose.

3. The method of claim 1, wherein the initial concentration of oxygen in headspace of the package is 20.9%.

4. The method of claim 3, wherein the concentration of oxygen in the sealed package is less than 10% within 1 day of being sealed.

5. The method of claim 1, wherein the load of anticaking agent is about 4 wt. %.

6. The method of claim 1, wherein the anticaking agent further comprises between 70 wt. % and 85 wt. % non-dairy ingredient chosen from corn starch, potato starch, cellulose, and combinations thereof.

7. The method of claim 1, wherein the mixing occurs in a tumbler.

8. The method of claim 1, further comprising proportioning the anticake-coated cheese shreds.

9. The method of claim 1, further comprising gravity feeding the anticake-coated cheese shreds through a vertical bagger to fill the package.

10. The method for producing a package of cheese shreds of claim 1, comprising
mixing cheese shreds and anticaking agent at a load between 2 wt. % and 10 wt. % in relation to the cheese shreds to form anticake-coated cheese shreds, the anticaking agent comprising 15-30 wt. % dextrose and 0.01-0.05 wt. % glucose oxidase; and
sealing the anticake-coated cheese shreds into a package without modifying the atmosphere in the package or using an inert gas flush;
wherein the initial concentration of oxygen in headspace of the package is 20.9%, the concentration of oxygen in the sealed package is less than 0.5% within 3 days of being sealed.

11. An anticaking agent for cheese, comprising:
15-30 wt. % reducing sugar; and
0.01-0.8 wt. % glucose oxidase;
wherein the anticaking agent draws down atmospheric oxygen concentration in a sealed package from 20.9% to less than 0.5% within 3 days of being sealed.

12. The anticaking agent of claim 11, wherein the reducing sugar is dextrose.

13. The anticaking agent of claim 11, wherein the concentration of oxygen in the sealed package is less than 10% within 2 days of being sealed.

14. The anticaking agent of claim 11, wherein the anticaking agent further comprises between 70 wt. % and 85 wt. % non-dairy ingredient, chosen from corn starch, potato starch, cellulose, and combinations thereof.

15. The method of claim 1, wherein the anticaking agent comprises 0.01-0.2 wt. % glucose oxidase.

16. The method of claim 15, wherein the anticaking agent comprises 0.01-0.05 wt. % glucose oxidase.

17. The anticaking agent of claim 11, comprising 0.01-0.2 wt. % glucose oxidase.

18. The anticaking agent of claim 17, comprising 0.01-0.05 wt. % glucose oxidase.

* * * * *